(12) United States Patent
Lussner

(10) Patent No.: US 8,479,764 B2
(45) Date of Patent: Jul. 9, 2013

(54) SAFETY VALVE

(75) Inventor: Wolfgang Lussner, Bruck an der Mur (AT)

(73) Assignee: BHDT GmbH, Kapfenberg (AT)

( * ) Notice: Subject to any disclaimer, the term of this patent is extended or adjusted under 35 U.S.C. 154(b) by 1057 days.

(21) Appl. No.: 12/486,286

(22) Filed: Jun. 17, 2009

(65) Prior Publication Data
US 2009/0320938 A1    Dec. 31, 2009

(30) Foreign Application Priority Data

Jun. 18, 2008  (AT) ................. A 972/2008

(51) Int. Cl.
*F16K 17/20*    (2006.01)
(52) U.S. Cl.
USPC ............... 137/469; 137/531; 251/337
(58) Field of Classification Search
USPC .. 137/469, 471, 529, 531, 535, 538; 251/235, 251/238, 243, 337
See application file for complete search history.

(56) References Cited

U.S. PATENT DOCUMENTS

| 58,962 | A | | 10/1866 | Naylor | |
|---|---|---|---|---|---|
| 1,408,603 | A | * | 3/1922 | Friedrich | ............ 251/243 |
| 2,973,777 | A | | 3/1961 | Troxell | |
| 3,229,713 | A | * | 1/1966 | Wiegand | ............ 137/467 |
| 4,201,242 | A | | 5/1980 | Troxell | |
| 5,909,748 | A | | 6/1999 | LaCroix | |

FOREIGN PATENT DOCUMENTS

| DE | 5 369 | 5/1879 |
|---|---|---|
| DE | 1 163 100 | 2/1964 |
| DE | 198 60 578 | 6/2000 |
| FR | 1 468 643 | 2/1967 |
| JP | 08121626 | 5/1996 |
| SU | 723 260 | 3/1980 |
| SU | 1 046 565 | 10/1983 |

OTHER PUBLICATIONS

Extended European Search Report that issued with respect to European Patent Application No. 09162691.1, mailed Aug. 30, 2010.

* cited by examiner

*Primary Examiner* — Kevin Lee
*Assistant Examiner* — P. Macade Brown
(74) *Attorney, Agent, or Firm* — Greenblum & Bernstein, P.L.C.

(57) ABSTRACT

The invention relates to a safety valve (1) with an inlet (2) and an outlet (3) and a closing element (4) which seals the inlet (2) and moves under overpressure, thus opening a way from the inlet (2) to the outlet (3), wherein the closing element (4) is connected by at least one arm (5) to at least one spring element (6), against the force of which the closing element (4) moves during opening. According to the invention an arm (5) is provided, which connects closing element (4) and spring element (6), wherein the arm (5) is swivel-mounted respectively about an axis (7, 8) on the closing element (4) and on the spring element (6) and is rotatable around a further axis (9) arranged between the cited axes (7, 8) and is longitudinally displaceable with respect thereto, whereby an optimal adjustment of a spring force with respect to forces acting on the closing element (4) is given.

14 Claims, 3 Drawing Sheets

SAFETY VALVE

Figure 1:
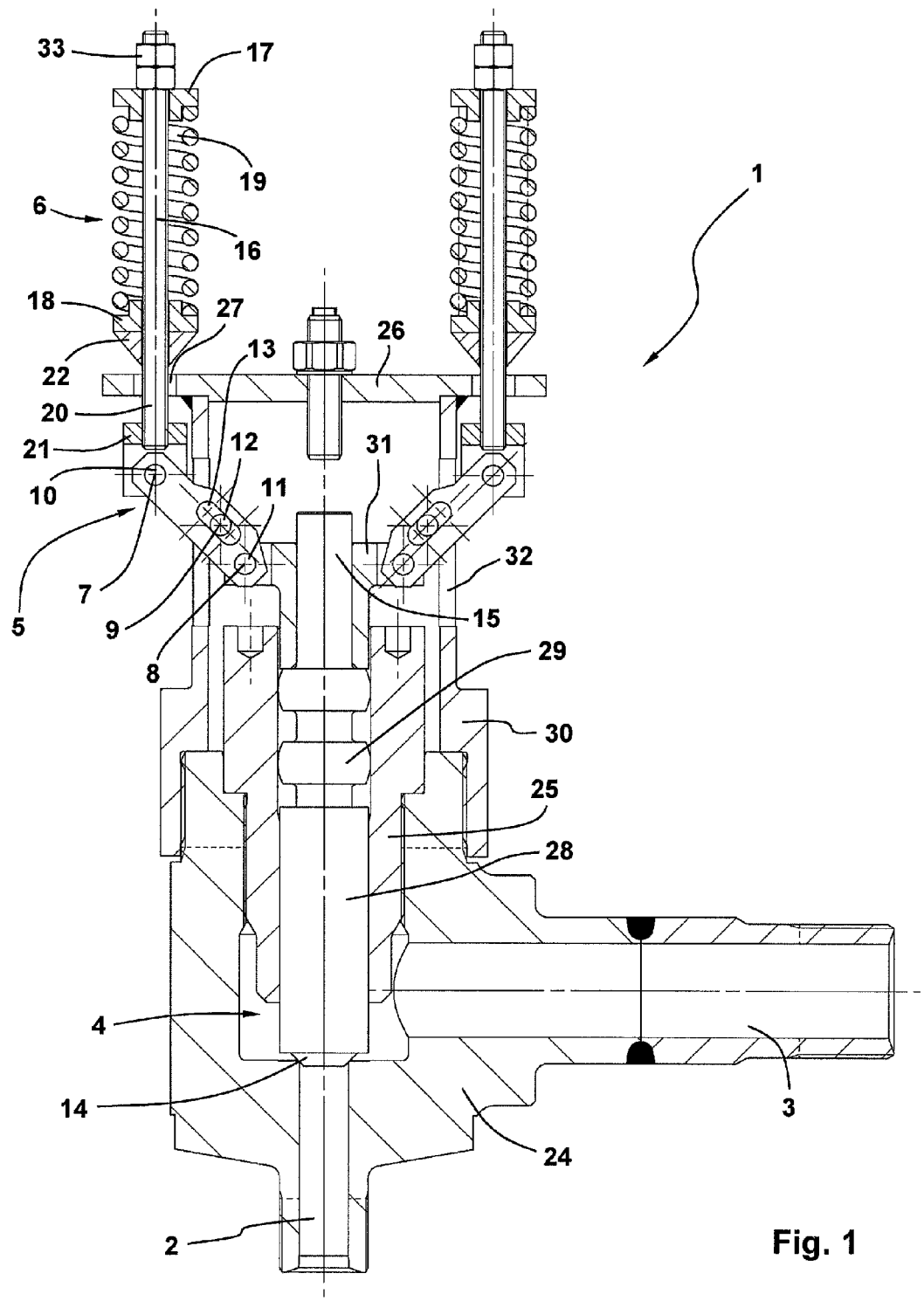

The invention relates to a safety valve with an inlet and an outlet and a closing element, which seals the inlet and moves under excess pressure, thus opening a way from the inlet to the outlet, wherein the closing element is connected by at least one arm to at least one spring element, against the force of which the closing element moves during opening.

Safety valves in use today are exposed on the one hand to high temperatures, for example, in steam power plants currently up to 560° C., in the future up to 700° C., and high pressures up to 350 bar, and on the other hand, e.g., in petrochemistry, can come into contact with extremely aggressive media such as acids.

With many safety valves, one or more springs are used to hold or move back a closing element, wherein efforts are made to position the springs, which are sensitive per se, as far as possible from the flow path(s) of the possibly aggressive media, sometimes also at high temperatures, located in a safety valve in order to spare the springs.

As springs, usually those springs are used that have a linear spring characteristic, but this is associated with several disadvantages. If a linear spring force acts on the closing element, during opening this closing element firstly exhibits a less sensitive response behavior due to the acting linear spring force, which is why an undesirably high pressure difference is to be provided for opening the closing element with safety valves equipped with springs of this type. Another disadvantage is that, while the closing element is opening, a spring force acting on the closing element is too low when the closing element moves over longer paths, and a force that is too low is opposed to a force acting on the closing element, i.a., through a pulse of a flowing medium. This means that the closing element, after initially delayed opening, moves at a high speed and ultimately can strike other parts of the safety valve with little braking, whereupon the closing element oscillates several times about an equilibrium position before, at best, achieving it. This effect is referred to as "flutter" in technical terminology.

According to the prior art or known printed publications, attempts have already been made in different ways to design a transfer of force of a spring element to a closing element in a variable manner (U.S. Pat. No. 4,201,242; U.S. Pat. No. 2,973,777; DE 198 60 578 A1; U.S. Pat. No. 58,962; JP 08121626 A1; U.S. Pat. No. 5,909,748). Although a transfer of force between the spring element and closing element can be influenced through the approaches selected in the cited printed publications, it is a disadvantage that the proposed safety valves are structured in an extremely complex manner, which can lead to problems with respect to the stresses in terms of temperature, pressure and corrosion attack which are particularly high anyway, and is therefore unsatisfactory. Furthermore, the known devices or safety valves do not adequately take into account the fact that the forces on the closing element change significantly during the movement thereof.

The object of the invention is to further develop a safety valve of the type described at the outset such that, with a simple structure, it adequately takes into account the forces acting on the closing element during the movement thereof, so that it already opens with a slight excess pressure without flutter occurring, however, during further opening.

This object is attained through a safety valve of the type mentioned at the outset in which an arm is provided which connects the closing element and spring element, wherein the arm is swivel-mounted respectively about an axis on the closing element and on the spring element and is rotatable around a further axis arranged between the cited axes and is longitudinally displaceable with respect thereto.

The advantages achieved with the invention are to be seen in particular in that through the embodiment provided of a connection of the closing element to the spring element by an arm, which is not only swivel-mounted about axes located on the closing element or spring element, but is also rotatable about a further axis arranged between the cited axes and is longitudinally displaceable with respect thereto, quasi a changeable lever arm is provided, which means that variable forces act on the closing element, which forces optimally allow for the positionally dependent forces acting on the closing element in particular during the movement thereof. The closing element on the one hand can thereby already open under slight excess pressures. On the other hand, after the closing element opens, during the further movement thereof a force acting on the closing element increases variably, so that a flutter of the closing element is essentially avoided.

The arm can be swivel-mounted about the provided axes on the closing element or spring element in any manner. In order to achieve the simplest possible embodiment of the safety valve, however, it is expedient that the arm is swivel-mounted on the closing element and on the spring element about the axes by means of bolts.

A longitudinal displaceability of the arm at the same time as a pivotability of the same about a further axis can be realized in a particularly simple manner if the arm has an elongated hole in which a further bolt engages on which the arm is supported.

Although other embodiment variants are also possible, it is expedient that the axes are arranged approximately in the area of ends of the arm so that a compact or space-saving construction is achieved.

Although the concept according to the invention can be applied to various safety valves, it has proven to be particularly expedient when the closing element is embodied in an elongated manner and with a preferably conical end piece that seals the inlet. The arm is then particularly preferably supported on the end of the closing element lying opposite the conical end piece. In principle, an end piece embodied in a flat manner can also be provided instead of a conical end piece.

The spring element can also be embodied in different ways, as long as the closing element is acted on with a desired spring force. However, it is favorable if the spring element comprises a longitudinal body with an upper spring holder and a lower spring holder and a spring held between the upper spring holder and the lower spring holder, wherein the longitudinal body penetrates the lower spring holder and can slide through it and is connected to the arm in the area of an end projecting beyond the lower spring holder or an extension connected thereto. The lower spring holder is thereby preferably embodied with a conical end. This makes it possible for the conical end of the lower spring holder to bear in an approximately half-spherical groove, whereby the necessary pivotability of the spring element can be realized in a particularly simple manner when the closing element and thus the arm is moved.

For the corresponding support of the conical end in the half-spherical groove or quite generally on a bearing surface, it has proven to be expedient that a base body is provided, in which the closing element is arranged, and the base body has a cover plate or another receptacle embodied in an expedient manner with a recess, through which the projecting end of the longitudinal body runs. A bearing surface for the spring element is thus provided in a simple manner, and the longitudinal body can move essentially without friction and tilt the spring element as needed. Although other embodiments are also possible, in a preferred embodiment variant of a safety valve according to the invention the spring element stands essentially vertically in a sealing position of the closing element and does not tilt until the closing element moves or until the arm moves.

The closing element can be embodied in particular in a vertically moveable manner, although the closing element can also be moveable in a different manner.

Furthermore with a safety valve according to the invention several, preferably two to four, spring elements can be provided. This has proven to be especially favorable when a low construction height of the safety valve is desired. In order to achieve the most uniform possible force distribution on the closing element, the individual spring elements are thereby arranged about the closing element preferably in a rotationally symmetrical manner in a plan view of the safety valve.

Figure 2:
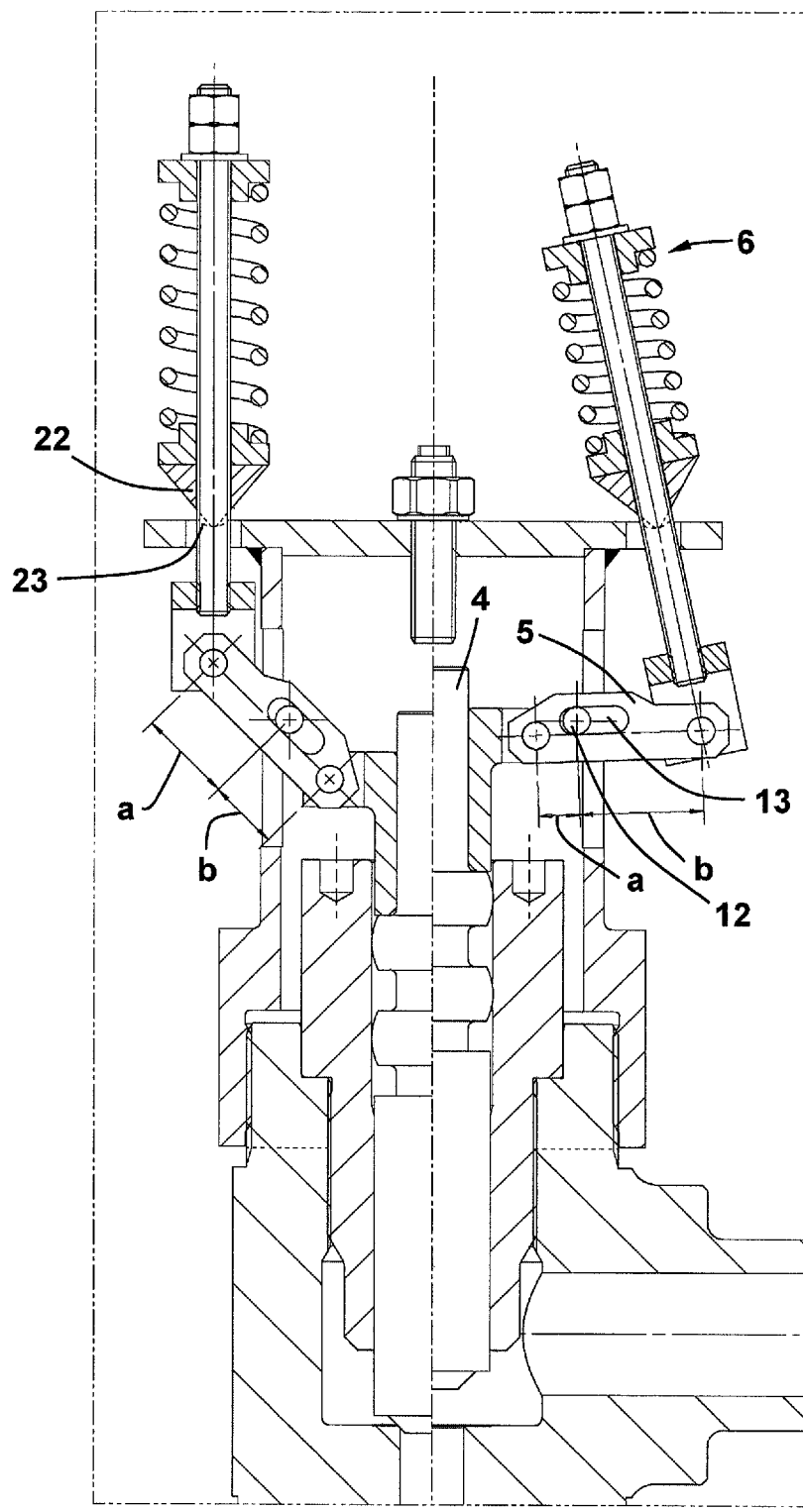
Figure 3:
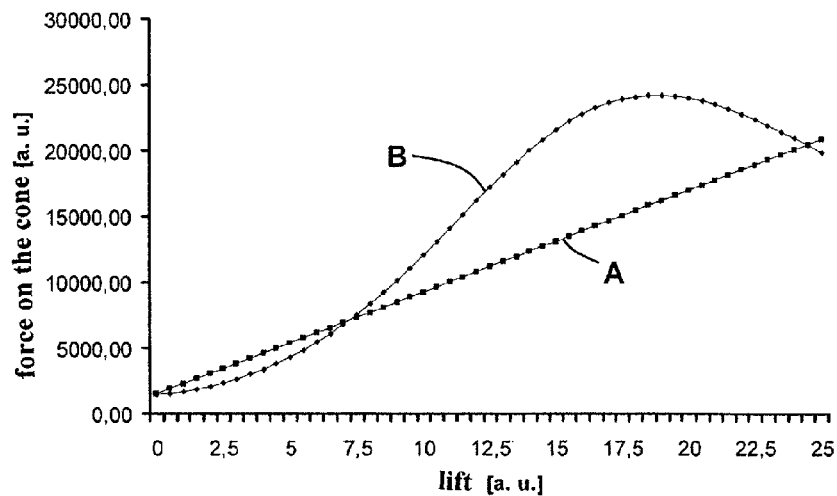
Figure 4:
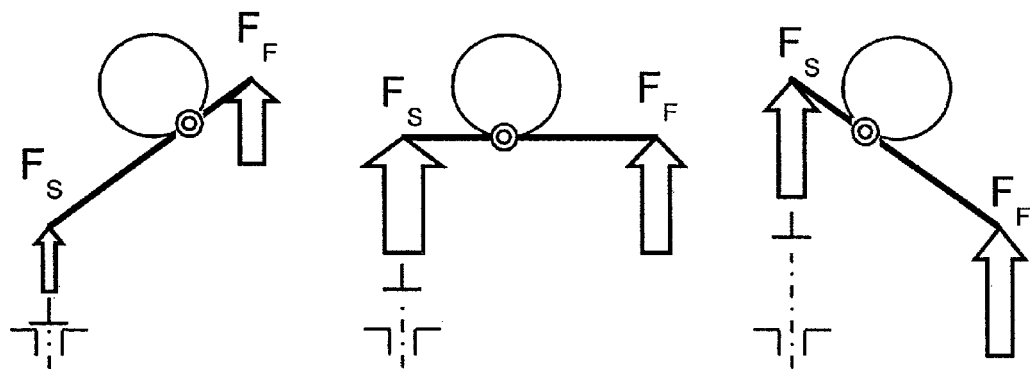

Further features, advantages and effects of the invention are shown by the exemplary embodiment shown below, based on which the invention is described in more detail. The attached drawings, to which reference is thereby made, show:

FIG. 1 A cross section of a safety valve according to the invention;

FIG. 2 Parts of a safety valve according to the invention in the closed state (left) and in the partially opened state (right);

FIG. 3 A diagram regarding forces acting on the sealing end of a closing element;

FIG. 4 A diagrammatic representation regarding force ratios with a safety valve according to the invention.

FIG. 1 shows a safety valve 1 according to the invention according to an embodiment variant of the invention. The safety valve 1 comprises a base body 24 with an inlet 2 and an outlet 3. The inlet 2 is connected to a line in which a liquid, in particular an aggressive medium having, for example, a temperature of 300° C., is transported. The inlet 2 is sealed by a closing element 4 of the safety valve 1, wherein a conical end piece 14 of the closing element 4 ensures the seal. In this state shown in FIG. 1, a pressure of a liquid transported in a line is too low to move the closing element 4 out of the position shown.

The closing element 4 embodied in an elongated manner has a cylindrical part 28 following the conical end piece 14, which cylindrical part can be embodied in a hollow or solid manner. Following the cylindrical part 28, the closing element 4 is embodied in a tapering manner, wherein, however, two sliding areas 29 are provided, the outer diameter of which corresponds to that of the cylindrical part 28. These sliding areas 29 are arranged between the cylindrical part 28 and an end 15 lying opposite the conical end piece 14.

The closing element 4 is held in a vertically moveable manner in a seat 25. The seat 25 in turn is enveloped by the base body 24 in which the inlet 2 and the outlet 3 run. An outer part 30 is arranged around an upper end of the base body 24, which outer part has lateral apertures 32 and bears a cover plate 26.

The closing element 4 is enclosed by a T-piece 31 in the area of the end 15 lying opposite the conical end piece 14. An arm 5 is swivel-mounted about an axis 8 on this T-piece 31, wherein a bolt 11 is provided for the swivel mounting. The arm 5, which is composed, for example, of steel, is embodied essentially in a rigid and straight manner and likewise swivel-mounted about an axis 7 on its other end on a spring element 6, wherein a bolt 10 is again provided for the mounting. Furthermore, the arm 5, which can be placed against the closing element 4 at an angle of approximately 30° to 75° in the situation shown in FIG. 1, is swivel-mounted approximately centrally around a further axis 9, wherein a bolt 12 is again used for the support. However, the arm 5 is not only rotatable about this bolt 12, but also displaceable with respect to the axis 9 in a perpendicular manner thereto because an elongated hole is provided. The arm 5 can be surface hardened in the area of the elongated hole 13 to provide greater wear resistance.

The bolt 10, on which the arm 5 is supported in order to connect the spring element 6 to the closing element 4, is part of an extension 21 of the spring element 6. The spring element 6 comprises a longitudinal body 16 connected to the extension 21, which longitudinal body penetrates the cover plate 26 with a projecting end 20 through a recess 27 and on the opposite side of the cover plate 26, comprises an upper spring holder 17, a lower spring holder 18 and a spring 19 located between them. The lower spring holder 18 bears in a groove 23 (not visible in FIG. 1) in the cover plate 26, namely with a conical end 22. The longitudinal body 16 can slide through the lower spring holder 18 which, as mentioned, bears against the cover plate 26, wherein the spring 19 is further loaded.

In the situation shown in FIG. 1, a sufficient preloading is applied by screws 33, so that the spring 19 of the spring element 6 presses the upper spring holder 17 upwards and thus also pulls the arm 5 upwards, whereby the closing element 4 is pressed downwards due to the flexible connection provided. The safety valve 1 as shown is thus in the closed state.

In FIG. 2, this situation is shown again on the left side, wherein the groove 23, in which a tip of the conical end 22 bears, is also indicated. If an excess pressure in a line is now so great that the closing element 4 moves vertically upwards, due to the flexible connection to the closing element 4 the arm 5 pivots and at the same time is displaced around the axis 9 or the bolt 12 so that the lever distances a, b change, and the position shown on the right in FIG. 2 is temporarily adopted, with the achievement of which a tilting of the spring element 6 is associated at the same time. When the arm 5 has reached a horizontal position, the bolt 12 is located in a limit position. With further vertical movement of the closing element 4, the arm 5 moves downwards in the area of a connection to the spring element 6 and at the same time slides upwards, changing the lever distances a, b around the bolt 12, wherein the spring element 6 finally tilts back again. A maximum tilt angle of the spring element 6 is about 30°. If several spring elements 6 are provided for a single closing element 4, which is advantageous with respect to a low construction height of the entire safety valve 1, the spring elements 6 are arranged such that they do not touch one another at a maximum tilt angle. Tilt angles of less than 10° are preferred with respect to a space-saving construction.

FIG. 3 shows how the design according to the invention of a safety valve 1 acts on the forces at the conical end piece 14 of the closing element 4. Whereas the characteristic shown according to line A is obtained with a spring or a spring element with linear characteristic curve, the force characteristic obtained with a safety valve 1 according to the invention according to line B is variable. As can be seen in FIG. 3, a force relative to a force of a spring with a linear characteristic curve is lower at the start of a rise of the closing element 4. That means that the closing element 4 already opens under a lower force or under a lower overpressure in a line. However, the force acting on the closing element 4 or the conical end piece 14 increases more as the rise increases compared to a spring with a linear characteristic curve, so that the closing element 4 is braked by the now increasing force after opening and with further movement, which is why it ultimately gently approaches its end position in which the force can then decrease due to the embodiment. Through this embodiment, a flutter is at least largely, ideally completely, avoided.

Finally FIG. 4 shows diagrammatically how the leverage conditions change due to the longitudinally displaceable arm 5 of the safety valve 1 according to the invention during an upward movement of the closing element 4. As can be seen based on the sequence (from left to right) from a sealing position of the closing element 4 via a half opened position to a completely opened position, the forces $F_S$ acting during a movement of the closing element 4 can be taken into account in a targeted manner by variable counteracting forces $F_F$ through a combination of pivotability and longitudinal displaceability of the arm 5. It is taken into consideration in particular thereby that only static forces act on the conical end 14 or the closing element 4 at the start of opening, whereas in the course of a further movement of the closing element 4 or a further opening of the same, dynamic forces are also present, which are adequately counteracted through the provided embodiment of the safety valve 1.

CROSS-REFERENCE TO RELATED APPLICATIONS

The present application claims priority under 35 U.S.C. §119 of Austrian Patent Application No. 972/2008 filed Jun. 18, 2008, the disclosure of which is expressly incorporated by reference herein in its entirety.

The invention claimed is:

1. A safety valve comprising:
an inlet;
an outlet; and
a closing element, which seals the inlet and moves under overpressure to open a way from the inlet to the outlet,
wherein the closing element is connected by at least one arm to at least one spring element, against the force of which the closing element moves during opening,
wherein the at least one arm connects the closing element and the spring element,
wherein the at least one arm is swivel-mounted respectively about a first axis on the closing element and a second axis on the spring element, and
wherein the at least one arm is rotatably mounted about a further axis arranged between the first and second axes and the at least one arm is longitudinally displaceable with respect to the further axis.

2. The safety valve according to claim 1, wherein the at least one arm is swivel-mounted about the axes on the closing element and the spring element via bolts.

3. A safety valve comprising:
an inlet;
an outlet; and
a closing element, which seals the inlet and moves under overpressure to open a way from the inlet to the outlet,
wherein the closing element is connected by at least one arm to at least one spring element, against the force of which the closing element moves during opening,
wherein the at least one arm connects the closing element and the spring element,
wherein the at least one arm is swivel-mounted respectively about a first axis on the closing element and a second axis on the spring element and is rotatable around a further axis arranged between the first and second axes and is longitudinally displaceable with respect thereto, and
wherein the at least one arm has an elongated hole in which a bolt engages, and on which the at least one arm is supported.

4. The safety valve according to claim 1, wherein the first and second axes are arranged approximately in the area of ends of the at least one arm.

5. The safety valve according to claim 1, wherein the closing element is embodied in an elongated manner with a conical end piece that seals the inlet, and the at least one arm is supported on an end of the closing element lying opposite the conical end piece.

6. The safety valve according to claim 1, wherein the closing element is vertically moveable.

7. The safety valve according to claim 1, wherein several spring elements are provided.

8. The safety valve according to claim 7, wherein the spring elements are arranged about a movement axis of the closing element in a rotationally symmetrical manner.

9. The safety valve according to claim 7, wherein the several spring elements comprise between two and four spring elements.

10. A safety valve comprising:
an inlet;
an outlet; and
a closing element, which seals the inlet and moves under overpressure to open a way from the inlet to the outlet,
wherein the closing element is connected by at least one arm to at least one spring element, against the force of which the closing element moves during opening,
wherein the at least one arm connects the closing element and the spring element,
wherein the at least one arm is swivel-mounted respectively about a first axis on the closing element and a second axis on the spring element and is rotatable around a further axis arranged between the first and second axes and is longitudinally displaceable with respect thereto,
wherein the spring element comprises a longitudinal body with an upper spring holder and a lower spring holder and a spring held between the upper spring holder and the lower spring holder,
wherein the longitudinal body is arranged to penetrate and slide through the lower spring holder and is connected to the at least one arm in an area of one of an end projecting beyond the lower spring holder or an extension connected to an end projecting beyond the lower spring holder.

11. The safety valve according to claim 10, wherein the lower spring holder is embodied with a conical end.

12. The safety valve according to claim 11, wherein the conical end of the lower spring holder bears in an approximately half-spherical groove.

13. The safety valve according to claim 10, wherein a base body is provided, in which the closing element is arranged, and the base body has a cover plate with a recess, through which the projecting end of the longitudinal body runs.

14. The safety valve according to claim 10, wherein the spring element stands essentially vertically in a sealing position of the closing element.

* * * * *